United States Patent Office 3,490,444
Patented Jan. 20, 1970

3,490,444
THERMOPLASTIC SPLINT OR CAST
Lester M. Larson, 4619 Bailey Drive, Limestone Acres, Wilmington, Del. 19808
No Drawing. Filed Nov. 14, 1967, Ser. No. 683,016
Int. Cl. A61f 5/04, 13/06
U.S. Cl. 128—90          10 Claims

ABSTRACT OF THE DISCLOSURE

Polydiene sheet material useful as a body supporting member such as a cast or splint, heat softenable at higher than body temperatures, but slowly recrystallizable below about 40° C., treated by distributing throughout the substance small reenforcing fibers whereby the cast material when formed about bony irregularities of the body remains dimensionally stable over long periods of use, and which may be coated with a protective coating removable just before use to resist oxidation and thereby maintain its cohesive properties over long storage periods.

---

This invention relates to improved materials for forming body-supporting casts or splints from thermoplastic sheets and tapes which becomes self-adherent and moldable when softened with moderate heat and slowly harden by crystallization to a firm, non-brittle plastic splint or tape on cooling to approximate body temperatures such as heating above about 65° C. to soften and cooling to below about 40° C. by crystallization of its polymer substances.

More particularly, this invention among several improvements is directed to fiber reenforcement of such heat softenable and crystallizable moldable plastic sheet product by having embedded therein short fibers which strengthen by inhibiting the deformation of the splint or cast after setting from its dimensionally true form as applied. This invention further includes among other significant improvements upon my prior concept provision to maintain the body-contacting surface of the sheet material in an antiseptic state before use.

It is known in the art, according to my prior invention, Canadian Patent 746,291, dated Nov. 15, 1966, that certain polydienes, typically transpolyisoprene such as natural balata, freed of natural resins by precipitation, its synthetic form such as transpolyisoprene, as well as polychloroprene, are useful plastic substances cast or milled to sheet form or tape form for forming cast and splint materials.

It has been proposed in my prior patent that these selected polymers be heated in hot water to a temperature usually exceeding about 65° C. and up to about 110° C., whereby they become soft and self-coherent, and pliable, sufficient to be deformed and shaped as a cast or splint about a broken or deformed body member requiring such mechanical support, and then cooled in situ in the desired shaped or deformed position about the body member to be supported to below about 40° C., such as body temperature, whereby the so-shaped formed plastic sets by slow crystallization to assume a rigid form as a useful body support member.

It is now found that such materials develop a creep or cold plastic flow over substantial prolonged periods of use when so emplaced as a body support member, undesirable in a body splint, cast or other body support member, particularly where close support is needed, and thereby loses its immediate utility as a form-fitting shape as needed with adequate firmness over the life of its use. Moreover, in many cases, such slight creep or misfitting deformation becomes irritating to protruding bone structures as in arthritic supports which becomes highly irritating and painful.

Some effort was proposed in my prior patent to adhere sheets of the polymer to woven fabrics as a laminate either as the outer surface thereof or reinforcement between plastic sheets primarily to make the surface more comfortable but which had little dimension or sterilizing effect. Moreover, in most instances this has not only been inadequate, but has interfered with close dimensional shaping about the protruding bone structure which was needed for close form-fitting in most instances.

It is now found, according to the present invention, that if the polymeric diolefine of the above-stated composition is mixed in a fluidized state, such as after substantial heat softening, even, and less desirable, during its formation from monomeric diene, with short lengths of reenforcing fibers in quantity such as from about 2 to 15% of the plastic material, the plastic sheets are greatly enhanced in utility by reducing cold creep or flow for the stated medical purpose of forming a splint or cast for bony body support members, retaining its original preset deformed dimension and shape with faithful accuracy and without creep or flow in prolonged substantial periods of use. Such reenforcing fiber may be natural such as cotton fiber or synthetic such as nylon or acrylic fiber.

In a further aspect of this invention it is found to be desirable for the many medicinal applications for which bony support structures are applicable, it is desirable that the surface of the deformable support sheets, after forming, be treated to make them antiseptic to medically acceptable standards and be so maintained as such for easy field use, preferably by applying a coating easily removable in the field just prior to use. For this purpose several protective compositions and materials are available and would be useful herein.

For instance, it is useful to adhere to the deformable plastic sheet an extraneous surface-protective tape material having a pressure-sensitive adhesive coating in the protective member, whereby just prior to use the protective sheath may be torn loose and thus provide a medically-acceptable antiseptic surface upon the deformable plastic sheet for contacting the injured body member as the internal surface of the cast or splint material.

It is also useful to apply to the plastic material an antiseptic unguentuous coating containing antiseptic materials which melt off by heat steeping the plastic sheet in hot water to soften prior to applying to the body as a cast or splint member, and is thus removed. However, the formerly-coated plastic sheet surface still remains medically antiseptic and cohesive when brought together in contact with the body member to be supported. It is not necessary that the coating be unguentuous but, in fact, it may be a relatively solid waxy and/or a water-soluble material, soluble or softenable, and thus easily removable in a hot water bath in which the sheet is steeped to prepare by softening for use. Hence, the coating dissolved or melted is removable at the softening temperature such as stated above. Thus, typically useful coatings are unguents, gelatin, paraffin wax, carbowax, sodium silicate and the like which, for antisepsis, may contain a quantity of quaternary ammonium halide, typically dimethyl benzyl lauryl ammonium chloride.

Besides providing an antiseptic surface for the softened sheet material to be applied to a body member in medical support thereof, as a cast or splint, the coating may also act as a protective member to preclude the decomposition of the polyolefinic plastic material generally susceptible to ready oxidation in air, so that after substantial storage periods, the sheet or tape will not lose its cohesive and heat-softenable character. Consequently, the coating hereof serves the function of protecting the plastic material both to maintain it in a medically antiseptic form as well as to prevent the hardening decomposition in storage by oxidation.

A great advantage, moreover, of incorporating small fiber into the thermoplastic sheeting is that its strength, particularly in tape form, is greatly enhanced, whereby the tape or plastic sheet, usually of a thickness ranging from about 80 up to 150 to 200 mils, may be reduced, such as to below 80 mils, and easily wound in softened state about the member to be reenforced as a relatively thin tape setting after cohesion in layers about the injured body member to a cast or splint of greater dimensionally-stable strength.

It is preferred, as previously stated, that the fiber-filled polyolefine plastic as above identified, formed into sheets or tapes, usually not exceeding 150 mils and preferably as low as 50 to 100 mils, after heating to soften to a temperature above about 65° C., slowly being applied as a cast or splint about an injured body member, will set slowly such as in about 10 minutes or longer, while the surgeon has substantial time also to cut and fit and apply the splint to the injured body member to the exact shape, form and thickness desired. The setting, as explained, is by crystallization of the plastic, and even though after heating to a temperature above 65° C., above that which the body could normally tolerate, it is readily cooled down to about 40° C. and takes such substantial time before crystallization sets in so as not to interfere with the easy deformability of the plastic material.

While as stated sheets in the range of 50 to 150 mils are practical for heavy casts, tapes filled with fiber may be made as thin as 5 mils and used as a wrapping tape in several plies about the injured member, thereby building the supporting plastic tape up to a desired thickness. While sheets of 200 mils thickness may be used in certain cast applications, a thickness of that degree is not necessary and would often require excessively long periods for both softening and setting in cast form.

In forming the sheet material, it is preferred to mill polymeric granules into sheets at a temperature high enough to fully soften the plastic, such as from 80° C. to 150° C., while supplying the reenforcing fiber in the desired quantity, such as 2 to 15 parts of fiber, by weight of the polymer. The sheets are then stretched upon trays to be cooled and cut to desired size for various surgical uses.

The following examples illustrate the practice of this invention:

EXAMPLE I 100 parts of precipitated balata (purified natural transpolyisoprene) were blended on a two-roll mill at about 90° C. for 15 minutes while adding 10 parts of cotton linters, 10 parts of finely-powdered titanium dioxide and ½ part of 2,2' methylene-bis (4-methyl-6-tertiary butyl phenol) as an antioxidant. The sheets obtained from the mill were molded into a frame to 130 mils thickness of approximately 12 inch square dimensions using a conventional rubber press having smooth platens heated at 100° C. under an applied pressure of about 500 psi. The compressed sheets were then removed from the frame and used to make a wrist support splint. In forming the splint it was dipped in a water bath for a half minute at a temperature just below boiling, about 95° C. and held therein, then withdrawn and cut into a deformable pattern with a pair of scissors to correspond to the contours of the wrist and fingers to be encased.. The softened sheet was molded into place closely about each joint and bony deformation and pressed. The contiguous cut parts of the splint were cohered into a unit by slight pressure and all rough edges are removed, smoothing with slight pressure. During the forming and shaping, if a longer time is needed to effect the perfect fitting of the cast, it may be slightly rewarmed by again dipping into the hot water bath. The emplaced and formed cast will set merely by holding the hand with the cast thereon quiescent for fifteen to thirty minutes, but the setting process can be accelerated by dipping the hand in ice water. It is to be noted that the sheets can be deformed over joints by manually working with applied pressure to fit closely about the contours of bony projections, etc., and after having set, this splint was found to be dimensionally stable, and close fitting, without irritation of bony projections typical of the hand and wrist for as long as in use. After completion and setting of the splint, any sharp edges resulting from cutting may be softened by warming the edge only with an applied alcohol lamp and then manually smoothing. The outer splint is so permanent that it can be used for years and it is easily applied to arthritic patients where the splint must be fitted about the swollen bone projection with a good, close and delicate fit.

EXAMPLE II

Example I was repeated using synthetic balata having characteristics similar to precipitated balata and from which are formed an opponens splint.

Clinical trial results were excellent. In comparison the splint was found to be superior to any heretofore available cast material, because it could be molded, immobilizing the joints without creep.

EXAMPLE III 100 parts of chloroprene prepared as described in Example 3a of Canadian Patent 746,291, is milled with 10 parts of nylon fibers averaging about one-quarter inch long, further being mixed with 10 parts of titanium oxide powder and 0.5 part of antioxidant, as in Example I. The composition is formed into sheets 130 mils thick and cut to size of about 12 inches by 20 inches.

These sheets are softened by warming a few seconds in water just under the boiling point and wrapped about a fractured arm to form a one-piece cast. After the wrap has been knit together at the juncture of the wrap, the excess material is trimmed off and the cast pressed firmly into the desired shape, fitting the contours of the limb. It is then allowed to cool for 20 minutes in air while being held in position. The cast is left on until healing has completed (about two months), This cast is much lighter than a plaster cast used for such immobilization and does not require a sling support for comfort.

EXAMPLE IV

The composition sheets as described in Example III are made up using 50 parts of synthetic balata and 50 parts of chloroprene and milled with 15 parts of half inch long cotton fiber, pigment and antioxidant. The sheets are made into casts with similar results to those obtained in Example III.

EXAMPLE V

The chloroprene composition fiber-filled sheets of Example III are heated at 95° C. in hot water to disinfect them, and are then coated with melted liquid paraffin wax and cooled on a flat platen to form a wax layer thereon about 1 mil thick. After standing for six months, these sheets are used for making a splint as described in Example III. The paraffin is wiped from the sheet after it has melted in the warm water. The sheets are found to have their original self-adherent properties. Sheets left open to the air without coating are difficult to use after six months for they lose surface-cohesive properties.

EXAMPLE VI

The sheets as used in Example IV are coated with sodium silicate by dipping three times into a 10% water glass solution and air drying between dips. The resultant effective coating is removed by dipping into hot water when warming to form a splint. Surface cohesion properties are retained for over six months.

In controlling the size of the sheet, the polymer is milled, usually at a temperature of between 80° C. and 90° C., and is then calendared to an exact thickness. It may be cut into wide sheets or thin strips, depending upon the type of use to which it is to be put, as described.

Since many widely different applications of this invention can be practiced by one skilled in the art without departing from its spirit and scope, it is understood that this invention is not limited in its specifics except as defined by the claims.

What is claimed is:

1. A sheet material having the property of being heat deformable and cold setting for medical use in the making of casts, splints or the like, comprising a polymer of a conjugated diolefinic compound hardenable to rigid hardness and free of substantial creep or deformation under long periods of use at temperatures below about 40° C., and softenable by heat at temperatures above about 60° C., said sheet having fibers homogeneously distributed throughout its body to impart dimensional stability, said sheet material being formed to a thickness in the range of about 5 to 200 mils.

2. The sheet material of claim 1 having from 2 to 15% by weight of reinforcing individual fiber selected from the group consisting of cotton fiber and nylon, homogeneously distributed therein, said fibers ranging in lengths from about 1/10 inch to 3 inches.

3. The sheet material of claim 1 wherein the thermo-softening, co-crystallizable sheet material is selected from the group consisting of polychloroprene, natural precipitated trans-polyisoprene and synthetic trans-polyisoprene.

4. A sheet material having the property of being heat deformable and cold setting for medical use in the making of casts, splints or the like, comprising a polymer of a conjugated diolefinic compound hardenable to rigid hardness and free of substantial creep or deformation under long periods of use at temperatures below about 40° C., and softenable by heating at temperatures above about 60° C., said sheet having an easily-removable temporary coating thereon protecting the sheet against oxidizing access of air.

5. The sheet material as defined in claim 4 wherein the coating is removable by warming in the range of 60 to 110° C. in a water bath.

6. The sheet material as defined in claim 4 having about 2 to 15 parts of short fiber lengths homogeneously milled into the body thereof before forming into sheets.

7. A process of forming a body supporting form such as a cast, splint or the like, comprising warming a sheet of polymer homogeneously containing from 2 to 15% by weight of short lengths of fiber distributed therein, said polymer consising of a conjugated diolefine compound hard setting by crystallization at temperatures below 40° C., and being heat softenable and pliable at raised temperatures in the range of 60° C. to 110° C., said sheet slowly crystallizing and setting upon cooling, whereby it may be deformed and shaped for use as a body supporting medical cast or splint as desired, and having a thickness in the range of about 2 to 200 mils, cutting said warmed sheet to dimensional size and manually shaping, wrapping and deforming said sheet about the body part to be supported and protected, and maintaining the entire supported assembly substantially immobile until it sets to a rigid support.

8. The method as defined in claim 7 wherein the diolefine compound is selected from the group consisting of polychloroprene, natural purified trans-polyisoprene and synthetic trans-polyisoprene.

9. The process as defined in claim 7 wherein there is an air protective coating thereon.

10. The process as defined in claims 7 and 9 wherein the sheet coating is softenable and removable in a hot water bath in which the sheet is placed to soften it.

References Cited

UNITED STATES PATENTS

| | | | |
|---|---|---|---|
| 2,375,365 | 5/1945 | Howald et al. | 128—90 XR |
| 2,616,418 | 11/1952 | Eberl | 128—90 |
| 3,388,083 | 6/1968 | Kwok | 260—17.4 |

L. W. TRAPP, Primary Examiner

U.S. Cl. X.R.

260—17.4